United States Patent

Bagrodia et al.

[11] Patent Number: 5,496,627
[45] Date of Patent: Mar. 5, 1996

[54] COMPOSITE FIBROUS FILTERS

[75] Inventors: Shriram Bagrodia, Kingsport; Bobby M. Phillips, Jonesborough; William A. Haile, Kingsport, all of Tenn.

[73] Assignee: Eastman Chemical Company, Kingsport, Tenn.

[21] Appl. No.: 491,387

[22] Filed: Jun. 16, 1995

[51] Int. Cl.$^6$ .............................. D02G 3/00; B32B 3/00
[52] U.S. Cl. ...................... 428/284; 428/286; 428/296; 428/298; 55/488
[58] Field of Search ................................ 428/284, 286, 428/296, 298; 55/488

[56] References Cited

U.S. PATENT DOCUMENTS

| | | | |
|---|---|---|---|
| 3,490,211 | 1/1970 | Cartier . | |
| 4,215,682 | 8/1980 | Kubik et al. | 128/146 |
| 4,267,002 | 5/1981 | Sloan et al. | 156/76 |
| 4,392,808 | 7/1983 | Phillips | 425/464 |
| 4,707,409 | 11/1987 | Phillips | 428/397 |
| 4,714,647 | 12/1987 | Shipp et al. | 428/212 |
| 4,824,451 | 4/1989 | Vogt et al. | 55/528 |
| 4,904,174 | 2/1990 | Moosmayer et al. | 425/174 |
| 4,954,398 | 9/1990 | Bagrodia et al. | 428/400 |
| 5,268,229 | 12/1993 | Phillips | 428/400 |
| 5,336,286 | 8/1994 | Alexander et al. | 55/528 |

FOREIGN PATENT DOCUMENTS

| | | |
|---|---|---|
| 0466778 | 1/1992 | European Pat. Off. . |
| 0558091 | 9/1993 | European Pat. Off. . |
| 06198108A | 7/1994 | Japan . |

OTHER PUBLICATIONS

"Grooved Surface Extends Filter Life," *Chemical Engineering*, Oct., 1994, p. 181.
"Filterration Equals Innovation," *Chemical Engineering*, Oct., 1994, pp. 119–120.
1994 "Nonwovens Conference" Proceedings, pp. 9–11.
Air Filtration Improved by Corona Charging of Fibrous Materials, Wadsworth and Psai, Textiles and Nonwovens Development Center (TANDEC), University of Tennessee, Knoxville, Tennessee.

*Primary Examiner*—Patrick J. Ryan
*Assistant Examiner*—Richard Weisberger
*Attorney, Agent, or Firm*—John F. Stevens; Harry J. Gwinnell

[57] ABSTRACT

Disclosed are novel composite fibrous structures which have utility as filters. These composite structures have at least two layers. The first layer is a nonwoven fibrous structure made from uniquely grooved fibers. The second layer is of a fibrous material that offers high filter efficiency.. The first layer has significantly lower pressure drop and higher dust holding capacity than the second layer.

17 Claims, 2 Drawing Sheets

COMPOSITE FIBROUS FILTERS

TECHNICAL FIELD

This invention relates to novel composite fibrous structures which have utility as filters. These composite structures contain unique grooved fibers that enable enhanced filter life. These composite structures have at least two layers. The first layer is a nonwoven fibrous structure made from uniquely grooved fibers. The second layer is of a fibrous material that offers high filter efficiency. The first layer has significantly lower pressure drop and higher dust holding capacity than the second layer.

BACKGROUND OF THE INVENTION

Filters are used to remove contaminants from fluid streams. In various applications, filters made from fibrous structures are used to remove dust particles from air streams. With conventional filters made from round cross-section fibers, as the dust is collected by the fibrous structures, there is a build-up of pressure drop with an increase in the dust retained by the filters. Filters are generally replaced once the pressure-drop across the filters reaches a pre-determined value. Particularly, filters made from submicron size fibers, such as melt blown fibers, have a very rapid build up of pressure with increased dust retention. This results in significantly reduced filter life. Grooved fibers provide unique capability to trap and store dust particles in the fiber grooves from the fluid stream that are smaller than the groove size and can therefore hold large amounts of dust without any significant rise in pressure drop. Thus, it is shown in the present invention that by utilizing nonwoven structures made from grooved fibers (as a first layer) in series with melt blown fibrous structures, the useful life of the composite filter structure can be significantly enhanced without adversely affecting the pressure drop. For particles as small as $0.1\mu$ NaCl, high filtration efficiencies are obtained at pressure drops essentially the same as in conventional fiber filters. In principle, one can make composite filter structures, wherein the second layer can be one having higher filtration efficiency than the first layer, but a greater pressure-drop than the first layer. The first layer is made from grooved fibers. The first layer may additionally contain binder fibers.

The fibrous structures may be electrostatically charged also. There may be a third layer to support the first two layers. When we have a composite structure, a large percentage of contaminant is removed by the first layer containing the grooved fibers. The first layer has a low pressure drop and a very large "dust capacity" as compared to the second layer. The second layer has a high filter efficiency. The composite fibrous structure has enhanced filter performance—a significant improvement in filter life.

U.S. Pat. No. 5,336,286 discloses a high efficiency air filtration media composed of fibrids, binder fiber, and staple fiber.

U.S. Pat. No. 4,904,174 discloses an apparatus for electrically charging melt blown webs.

U.S. Pat. No. 4,215,682 discloses melt blown fibrous electrets which improve the filtration efficiency of the filter media, however, the melt blown structures have a relatively high pressure drop. U.S. Pat. No. 4,714,647 discloses melt blown filter material having different fiber sizes along the depth of the filter. Japanese Patent 6198108A discloses composite filtering material made from sheets of inorganic fiber (glass fiber) and sheets of synthetic (organic) fiber.

Also, the following are of interest:

U.S. Pat. No. 3,490,211

Article from October 1994 issue of Chemical Engineering—pp 181, 119, 120

1994 "Nonwovens Conference" Proceedings, pp 9–11

Air Filtration Improved by Corona Charging of Fibrous Materials—Wadsworth and Tsai, Textiles and Nonwovens Development Center (TANDEC), University of Tennessee, Knoxville, Tenn.

European Patent Application 0 558 091 A1

U.S. Pat. No. 4,824,451.

DESCRIPTION OF THE INVENTION

According to the present invention there is provided

1. A filter for removing particulate matter from a fluid stream comprising a first layer of fibrous material and a second layer of fibrous material,
    a) said first layer comprising fibers having a denier of about 3.0 to about 15 and grooved in the longitudinal direction, said fibers having a cross-sectional shape factor of greater than 1.5 and a specific volume of about 1.5 to about 5 cc/g, and
    b) said second layer comprising fibers having a denier of about 0.1 to about 1.0.

According to another aspect of the invention, there is provided a method of filtering particulate matter from a fluid stream which comprises placing in said stream a filter comprising a) said first layer comprising fibers having a denier of about 3 to about 15 and grooved in the longitudinal direction, said fibers having a cross-sectional shape factor of greater than 1.5 and a specific volume of about 1.5 to about 5 cc/g, and b) said second layer comprising fibers having a denier of about 0.1 to about 1.0 wherein the pressure drop across said second layer ($\Delta P_2$) is much greater than the pressure drop across said first layer ($\Delta P_1$), the particle holding capacity of said first layer ($PHC_1$) is much greater than the particle holding capacity of said second layer ($PHC_2$), and the filtration efficiency of said second layer is greater than the filtration efficiency of said first layer.

Specifically, the filtration efficiency of the second layer is greater than 80% while the filtration efficiency of the first layer is below 80%. Also, $$\frac{\Delta P_2}{\Delta P_1}$$

should be greater than 3, preferably greater than 5. Also, $$\frac{PHC_1}{PHC_2}$$

should be greater than 3, preferably greater than 5.

Figure 1:
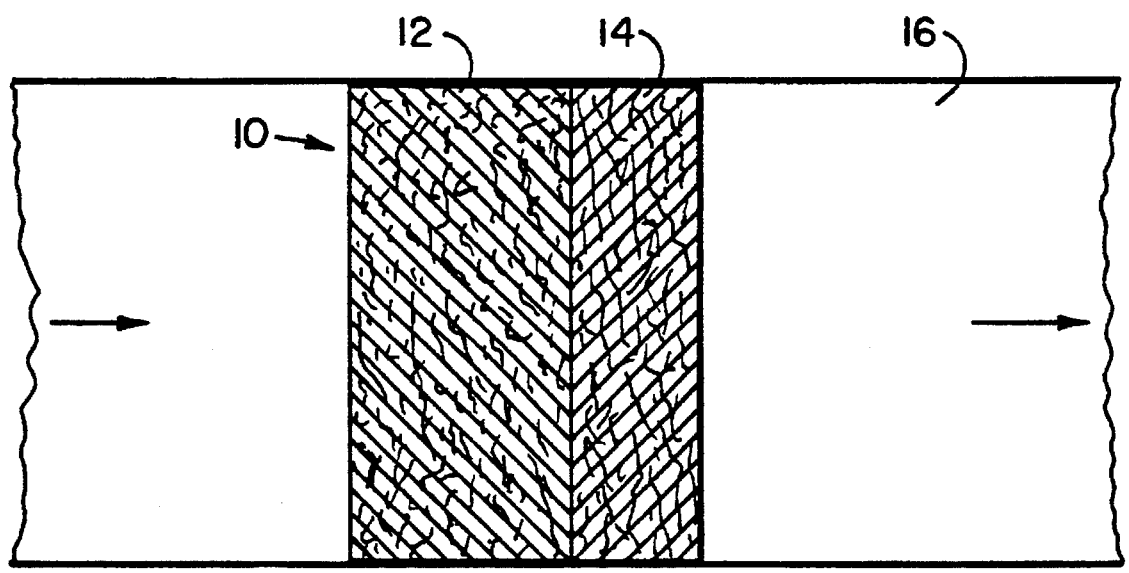
FIG. 1 is a cross section of a filter according to this invention having a layer of grooved fibers and a layer of conventional fibers.

Referring to FIG. 1, the filter 10 comprises a layer of grooved fibers 12 and a layer of conventional fibers 14. Flow of the fluid to be filtered is indicated by the arrow. A confining conduit is illustrated at 16.

Figure 2:
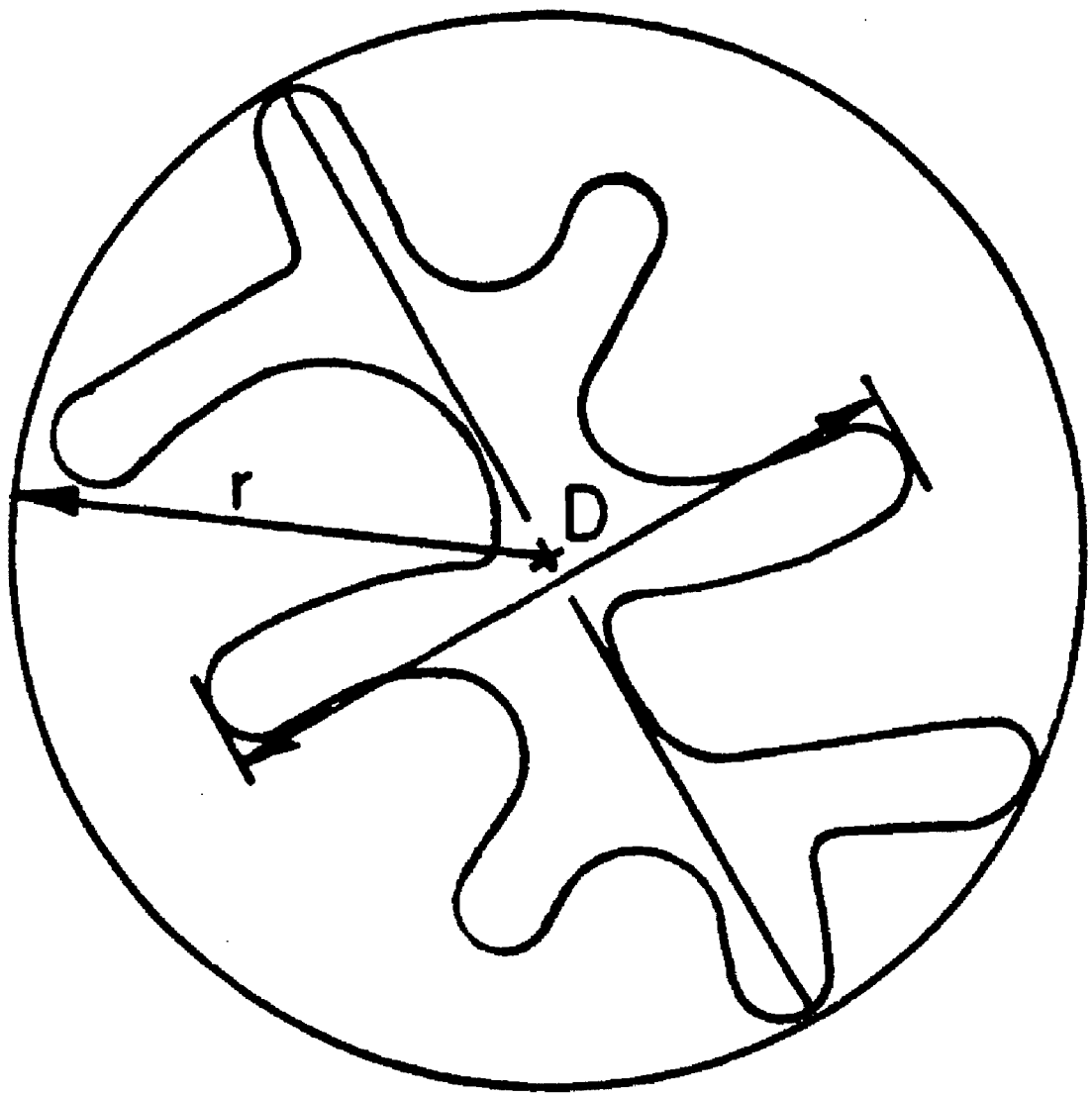
FIG. 2 is a cross section of a fiber having a shape factor greater than about 1.5 which is useful in the present invention.

Referring to FIG. 2, the cross section of a fiber used in the filters of this invention is shown. The fiber is irregular in cross-sectional shape, and has a shape factor of about 1.72.

The filters according to the present invention are unique in that their life is significantly enhanced. This is due to the filtered particulate matter being trapped in the grooves of the fibers. The layer of grooved fibers remove about 50–60% of the particulate material being filtered, while the layer of conventional fibers are very efficient as a filter, it quickly approaches a saturation condition (with filtered particulate material) and the pressure drop dramatically increases. Typically, the layer of grooved fibers will remove about 50–60% of the particles before the fluid stream being filtered gets to the second fiber layer. Typically, the total thickness will be at least 0.1 inch, preferably greater than 0.5 inch. As with conventional filters, the filters according to this invention will be placed generally transverse to the flow of the fluid stream.

The grooved fibers of the first layer are produced by conventional means using spinnerettes of a shape to produce grooved fibers. Suitable grooved fibers have a single fiber denier of about 3–15 denier per filament (dpf). The grooves extend in a longitudinal direction of the fiber, and in cross section, have a shape factor of greater than about 1.5.

Useful grooved fibers and their method of preparation are disclosed, for example, in U.S. Pat. Nos. 4,954,398, 4,707,409, 4,392,808, 5,268,229, and European Patent No. 0000466778, incorporated herein by reference.

Shape factor of the cross section of fibers used in the present invention relates to the irregularity of the fiber in cross section. Shape factor is defined by the equation $$X = \frac{P}{4r + (\pi - 2)D}$$

wherein P is the perimeter of the fiber and r is the radius of the circumscribed circle circumscribing the fiber cross section and D is the minor axis dimension across the fiber cross section.

In FIG. 2, the method for determining the shape factor, X, of the fiber cross section is illustrated. In FIG. 2, r=37.5 mm, P=355.1 mm, D=49.6 mm. Thus, X therefore, is $$X = \frac{355.1}{4 \times 37.5 + (\pi - 2)49.6} = 1.72$$

Although the grooved fibers of the first layer may be of any conventional material, polymers such as cellulose esters and polyesters are found to be very useful. Polymers and copolymers of ethylene terephthalate are particularly useful.

The grooved fibers of the first layer are preferably formed into a mat in random orientation, and may be staple or continuous. Preferably, these fibers are bonded by suitable thermal bonding or binder fibers. However, they may also be needle-punched into a mat by conventional procedures.

The fibers of the second layer are conventional in cross section and may be generally round, oval, geometrical shapes, curved, etc. They are produced by conventional spinnerettes well known in the art. The dpf of these fibers may also be in the range of about 0.1 to about 1.0 dpf. Also, they may be randomly oriented and either staple or continuous. A preferred embodiment of this invention is to make the fibers of the second layer into a mat by conventional melt blowing as disclosed in U.S. Pat. No. 4,267,002, incorporated herein by reference. Melt blown fibers would be round in cross-section.

The fibers of the second layer also may be of a conventional material such as natural or synthetic polymers. Preferred polymers include cellulose esters, polyesters, polyamides, etc. Especially preferred are polyolefins such as polypropylene.

Preferably, the fibers of one or both of the layers may be electrostatically charged. Charging of the fibers may be accomplished by methods known to those skilled in the art, for example, as disclosed in U.S. Pat. No. 4,215,682 incorporated herein by reference.

The first and second layers of fibers are typically formed separately and then placed in face-to-face contact. However, if desired, they may be spaced apart in the fluid stream to be filtered.

Typical uses for the filters according to this invention include, for example, removal of dust or smoke particles from gases such as air. Suitably, the filter would be placed in a conduit or other confined space for the passage of gas, and in a filter of conventional construction would be oriented in a position generally transverse to the flow of fluid to be filtered. The first layer of grooved fibers would be placed upstream of the second layer of fibers.

The term "layer" is used herein in a broad sense to include situations where a group of loose fibers of each kind described herein are placed together, or nearly together in a fluid conduit. Also, by the term "particulate", we intend to include not only solid particulate material, but also liquids such as droplets of water, for example.

The term "specific volume" is described as the volume in cubic centimeters (cc) occupied by one gram of the fibers.

The specific volume of the yarn or tow made from the fiber is determined by winding the yarn or tow at a specified tension (normally 0.1 g/d) into a cylindrical slot of known volume. The yarn or tow is wound until the slot is completely filled. The weight of yarn contained in the slot is determined to the nearest 0.1 mg. The specific volume is then defined as:

$$\text{Specific Volume @ 0.1 g/d} = \frac{\text{Volume of cylindrical Slot (cc)}}{\text{weight of yarn in the completely filled slot-gms}} = \frac{cc}{gms}$$

Filtration efficiency refers to the ability of the filter media to remove particulate matter from the feed stream. It can be measured in several ways. A simple way is to measure the weight of particulate matter fed to the filter media ($W_f$) and the weight retained by the filter media ($W_r$). The test dust can be SAE fine test dust. Then % gravimetric efficiency is defined as $$\% \text{ gravimetric efficiency} = \frac{W_r}{W_f} \times 100\%$$

There are various other methods to determine filter efficiency, such as defined in ASHRAE-52.1-1992 test method.

$E_2$: filtration efficiency of second layer >80%, $$\frac{\Delta P_2}{\Delta P_1} > 3, \text{ preferentially}$$

$$\frac{\Delta P_2}{\Delta P_1} > 5$$

particle holding capacity (PHC)

-continued $$\frac{(PHC)_1}{(PHC)_2} > 3, \text{ preferably} > 5$$

Particulate holding capacity is the amount of particles fed to the device, i.e., filtration material, being tested times its average arrestance until resistance to test device reaches the rated final resistance (pressure drop). Arrestance is the percentage of particles by weight captured by the filter media. Rated final resistance is the maximum operating resistance of the device at rated air flow rate. The definitions of initial resistance (pressure drop), atmospheric particle spot efficiency, particle holding capacity, arrestance (gravimetric efficiency) and ASHRAE synthetic dust as discussed in ASHRAE Standard 52.1-1992, The American Society of Heating, Refrigerating, and Air Conditioning Engineers, Inc., incorporated herein by reference.

In other words, particle holding capacity of a filter material may be defined as the amount of particles retained by the filter medium at the rated final resistance (pressure drop).

A measure of pressure drop can be obtained by Frazier air permeability test method ASTM-D737. High Frazier air permeability implies low pressure drop across the test medium.

Pressure drop across a filter medium can also be measured at a given air flow rate.

If desired, more than one of either or both of the first and second layers may be used in a filter according to this invention.

The following examples are presented for a better understanding of the invention.

Example 1

(Comparative) A melt blown layer, made from polypropylene fiber, having a basis weight of 1 oz/yd² was made on a standard melt-blowing unit and electrostatically charged. This layer was tested for filtration performance. The filter efficiency of 0.1μ NaCl particle was 98.2% and the pressure drop was 2.5 millimeters of water at an airflow of 32.5 Lts/min at the beginning of the test. Air was allowed to continually filter through the melt blown layer. After about 57 minutes, the efficiency was 99.4% and the pressure drop was 12.6 mm H₂O (very high pressure drop). Dust retained in the filter media after 57 minutes was about 180 mg. Filter area was 100 cm².

Example 2

(Comparative) A needle-punched fabric made from 6 dpf grooved fiber shown in FIG. 2 having a shape factor of about 1.72, basis wt 8.6 oz/yd², was scoured in isopropanol and hot water. It was electrostatically charged and tested for filtration performance. Initial pressure drop was 0.4 mm of water (low) and filter efficiency for 0.1μ NaCl was 75%. Pressure drop after 90 minutes of air flow remained low 0.5 mm H₂O.

Example 3

(Example of the present invention) A composite structure was made consisting of a first layer of needlepunched fabric of Example 2 and a second layer of melt blown fabric of Example 1 (polypropylene melt blown 1 oz/yd²). This composite structure is subjected to air filtration testing, with the needlepunched layer first facing the air-stream. Initial pressure drop was 3.0 mm water with a filter efficiency of about 98%. After about 60 minutes the pressure drop was 4.1 mm H²O, much lower than the pressure drop for Example 1 (12 mm water). In fact, after about 4 hours, the pressure drop was about 12.5 mm H₂O. The corresponding dust retained after four hours was 720 mgs. Thus about a four-fold increase in filter life is obtained for this composite structure, compared to that of the melt blown fabric of Example 1.

The invention has been described in detail with particular reference to preferred embodiments thereof, but it will be understood that variations and modifications can be effected within the spirit and scope of the invention.

We claim:

1. A filter for removing particulate matter from a fluid stream comprising a first layer of fibrous material and a second layer of fibrous material, said layers being in face-to-face contact,
    a) said first layer comprising fibers having a denier of about 3–15 and grooved in the longitudinal direction, said fibers having a cross-sectional shape factor of greater than 1.5 and a specific volume of about 1.5–5 cc/g, and
    b) said second layer comprising melt blown, thermally bonded fibers having a denier of about 0.1–1.0
wherein the pressure drop across said second layer is much greater than the pressure drop across said first layer, the particle holding capacity of said first layer is much greater than the particle holding capacity of said second layer, and the filtration efficiency of said second layer is greater than the filtration efficiency of said first layer.

2. A filter according to claim 1 having a plurality of at least one of said layers.

3. A filter according to claim 1 wherein the combined thickness of said layers is at least 0.1 inch.

4. A filter according to claim 1 wherein the combined thickness of said layers is at least 0.5 inch.

5. A filter according to claim 1 wherein the fibers of at least one of said layers are randomly oriented and bonded together.

6. A filter according to claim 1 wherein the fibers of at least one of said layers are thermally bonded.

7. A filter according to claim 1 wherein the fibers of at least one of said layers are needle punched.

8. A filter according to claim 1 wherein the fibers of at least one of said layers are melt blown into a mat.

9. A filter according to claim 1 wherein the fibers of at least one of said layers are electrostatically charged.

10. A filter according to claim 1 wherein said first layer fibers are polyester.

11. A filter according to claim 1 wherein said first layer fibers are polymers or copolymers of ethylene terephthalate.

12. A filter according to claim 1 wherein said second layer fibers are polyolefin.

13. A filter according to claim 1 wherein said second layer fibers are polypropylene.

14. A filter according to claim 1 wherein said first layer has a weight of about 1 oz/yd² to about 30 oz/yd².

15. The method of filtering particulate matter from a fluid stream which comprises placing a filter according to claim 1 into said stream.

16. The method according to claim 1 wherein said particulate matter is solid.

17. The method according to claim 16 wherein said particulate matter is liquid.

* * * * *

UNITED STATES PATENT AND TRADEMARK OFFICE
CERTIFICATE OF CORRECTION

PATENT NO. : 5,496,627
DATED : March 5, 1996
INVENTOR(S) : Shriram Bagrodia, et al.

It is certified that error appears in the above-indentified patent and that said Letters Patent is hereby corrected as shown below:

Column 6, line 60 (Claim 16), "claim 1" should be --- claim 15 ---.

Signed and Sealed this

Twenty-third Day of July, 1996

BRUCE LEHMAN

Attest:

Attesting Officer

Commissioner of Patents and Trademarks